(12) United States Patent
Choi et al.

(10) Patent No.: US 12,116,120 B2
(45) Date of Patent: Oct. 15, 2024

(54) BLADE-STATOR SYSTEM, AND VERTICAL TAKEOFF AND LANDING FLYING DEVICE INCLUDING SAME

(71) Applicant: HANWHA AEROSPACE CO., LTD., Changwon-si (KR)

(72) Inventors: Jae Ho Choi, Changwon-si (KR); Semi Kim, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 14 days.

(21) Appl. No.: 17/911,305

(22) PCT Filed: Mar. 31, 2020

(86) PCT No.: PCT/KR2020/004418
§ 371 (c)(1),
(2) Date: Sep. 13, 2022

(87) PCT Pub. No.: WO2021/187655
PCT Pub. Date: Sep. 23, 2021

(65) Prior Publication Data
US 2023/0114141 A1    Apr. 13, 2023

(30) Foreign Application Priority Data
Mar. 16, 2020    (KR) .................. 10-2020-0032279

(51) Int. Cl.
*B64C 29/00* (2006.01)
*F04D 29/56* (2006.01)

(52) U.S. Cl.
CPC ........ *B64C 29/005* (2013.01); *B64C 29/0091* (2013.01); *F04D 29/563* (2013.01)

(58) Field of Classification Search
CPC .................. B64C 29/005; B64C 29/0091
See application file for complete search history.

(56) References Cited

U.S. PATENT DOCUMENTS 4,795,111 A * 1/1989 Moller .................... B64C 27/00
                                                          244/100 R
5,421,538 A * 6/1995 Vassa (Suratano
                              Thienphropa) ......... B64C 27/20
                                                            244/23 B
(Continued)

FOREIGN PATENT DOCUMENTS

JP    2007-118891 A    5/2007
JP    2008-542128 A    11/2008
(Continued)

OTHER PUBLICATIONS

International Search Report (PCT/ISA/210) dated Nov. 30, 2020, issued by the International Searching Authority in counterpart International Application No. PCT/KR2020/004418.
(Continued)

*Primary Examiner* — Justin M Benedik
(74) *Attorney, Agent, or Firm* — Sughrue Mion, PLLC

(57) ABSTRACT

Embodiments of the present disclosure provide a blade-stator system and the vertical take-off and landing flight apparatus comprising the blade-stator system, the blade-stator system including a duct disposed inside a flight body, upper and lower sides of the duct being open, and an inside of the duct being hollow; a blade assembly installed rotatably inside the duct and including a blade body of which an angle is changeable; a stator assembly connected to the blade assembly and the duct, supporting the blade assembly, and rotatable by a predetermined angle; a controller electrically connected to the blade assembly and the stator assembly and configured to control driving of the blade body and the stator assembly, wherein the angle of the stator assembly is changed in response to receiving an electrical signal from the controller so as to be interlocked with a change of the angle of the blade body.

10 Claims, 8 Drawing Sheets

(56) References Cited

U.S. PATENT DOCUMENTS

| | | | | |
|---|---|---|---|---|
| 6,464,166 B1 * | 10/2002 | Yoeli | ....................... | B64C 27/20 |
| | | | | 244/12.3 |
| 7,249,732 B2 * | 7/2007 | Sanders, Jr. | ........... | B64U 30/24 |
| | | | | 244/12.1 |
| 2015/0314865 A1 * | 11/2015 | Bermond | ............ | B64C 29/0033 |
| | | | | 244/17.27 |
| 2018/0057157 A1 * | 3/2018 | Groninga | ................ | B64C 27/20 |

FOREIGN PATENT DOCUMENTS

| | | |
|---|---|---|
| KR | 10-0577757 B1 | 5/2006 |
| KR | 10-2010-0094056 A | 8/2010 |
| KR | 10-2013-0067583 A | 6/2013 |
| KR | 10-2013-0068041 A | 6/2013 |
| KR | 10-2015-0086398 A | 7/2015 |
| KR | 10-1749863 B1 | 6/2017 |
| KR | 10-1755278 B1 | 7/2017 |
| KR | 10-2018-0116849 A | 10/2018 |
| WO | 2006/131920 A2 | 12/2006 |
| WO | 2014/091092 A1 | 6/2014 |

OTHER PUBLICATIONS

Written Opinion (PCT/ISA/237) dated Nov. 30, 2020, issued by the International Searching Authority in counterpart International Application No. PCT/KR2020/004418.

\* cited by examiner

BLADE-STATOR SYSTEM, AND VERTICAL TAKEOFF AND LANDING FLYING DEVICE INCLUDING SAME

CROSS-REFERENCE TO RELATED APPLICATIONS

This application is a National Phase Entry of PCT International Application No. PCT/KR2020/004418, filed on Mar. 31, 2020, which claims priority to Korean Patent Application No. 10-2020-0032279, filed on Mar. 16, 2020, the contents of all of which are incorporated herein by reference in their entirety.

TECHNICAL FIELD

Embodiments of the present disclosure relate to a blade-stator system and a vertical take-off and landing flight apparatus including the blade-stator system, and more particularly, to a blade-stator system with improved performance by reducing a pressure loss at the outlet of a duct, and a vertical take-off and landing flight apparatus including the blade-stator system.

BACKGROUND ART

In general, flying methods used by aircrafts are classified into a take-off method wherein lift is generated along a runway and a vertical take-off and landing method wherein the aircraft flies forward by generating lift using multiple rotors and the flight direction is changed by changing the direction of the rotors or lift is generated by using a ducted fan and a propeller is used for propulsion in the case of high-speed flight.

In particular, in the case of a vertical take-off and landing flight apparatus, the vertical take-off and landing flight apparatus may quickly take off and land vertically even in a narrow flight area without a runway. Thus, the apparatus may perform various flight tasks and many studies have been conducted in this regard.

In the case of a fan-in-body type vertical take-off and landing flight apparatus in which the rotor is disposed inside the body of the flight apparatus in the prior art, because a strut located at the rear of the lift rotor is of a fixed type, much pressure loss occurs due to the swirl flow downstream of the rotor, and in particular, when the pitch angle of the rotor blade is changed and the swirl angle is increased, there is a problem in that the pressure loss further increases.

Korean Patent No. 10-1749863 (registered on Jun. 15, 2017, title of invention: Vertical Take-off and Landing Flight Apparatus) discloses a vertical take-off and landing flight apparatus having a ducted fan that generates lift.

DESCRIPTION OF EMBODIMENTS

Technical Problem

The present disclosure has been devised to improve the above problems, and an object of the present disclosure is to improve the performance by reducing a pressure loss at the outlet of a duct by changing the angle of a stator assembly in response to receiving an electrical signal from a controller so that the angle of the stator assembly is linked to the angle change of a blade body.

However, these problems are just examples, and the scope of the present disclosure is not limited thereto.

Solution to Problem

Embodiments of the present disclosure provide a blade-stator system including a duct disposed inside a flight body, wherein upper and lower sides of the duct are open, and an inside of the duct is hollow, a blade assembly installed rotatably inside the duct and including a blade body of which an angle is changeable, a stator assembly connected to the blade assembly and the duct, supporting the blade assembly, and rotatable by a predetermined angle, a controller electrically connected to the blade assembly and the stator assembly and configured to control driving of the blade body and the stator assembly, wherein the angle of the stator assembly is changed in response to receiving an electrical signal from the controller so as to be interlocked with a change of the angle of the blade body.

In the present disclosure, the stator assembly may include a fixed stator connecting the duct to the blade assembly and of which a position is fixed, and a variable stator disposed on one side of the fixed stator and rotatable by a predetermined angle with respect to the fixed stator.

In the present disclosure, the variable stator may include a variable vane rotating with respect to the fixed stator, and a vane driver connected to the variable vane and transmitting a rotational force to the variable vane.

In the present disclosure, the blade assembly may include a blade driver connected to the stator assembly and sharing a central axis with the duct, and at least one blade body rotatably coupled to the blade driver.

In the present disclosure, the at least one blade body may be spaced apart each other with respect to a center of the blade driver.

In the present disclosure, the blade-stator system may further include a guide vane disposed outside the blade assembly and the stator assembly, installed inside the duct, and guiding a flow path of air introduced into or discharged from the duct.

In the present disclosure, the guide vane may be electrically connected to the controller and may be rotatable inside the duct.

In the present disclosure, the guide vanes may be disposed above and below the blade assembly and the stator assembly and may be installed in the duct.

In the present disclosure, the stator assembly may be provided in plurality, may be spaced apart each other with respect to a center of the blade assembly, and may be connected to the duct.

Embodiments of the present disclosure provide a vertical take-off and landing flight apparatus including a flight body, and a blade-stator system, wherein the blade-stator system comprises a duct disposed inside the flight body, upper and lower sides of the duct being open, and an inside of the duct being hollow, a blade assembly installed rotatably inside the duct and including a blade body of which an angle is changeable, a stator assembly connected to the blade assembly and the duct, supporting the blade assembly, and rotatable by a predetermined angle, a controller electrically connected to the blade assembly and the stator assembly and configured to control driving of the blade body and the stator assembly, wherein the angle of the stator assembly is changed in response to receiving an electrical signal from the controller so as to be interlocked with a change of the angle of the blade body.

In the present disclosure, the stator assembly may include a fixed stator connecting the duct to the blade assembly and of which a position is fixed, and a variable stator disposed on one side of the fixed stator and rotatable by a predetermined angle with respect to the fixed stator.

In the present disclosure, the variable stator may include a variable vane rotating with respect to the fixed stator, and a vane driver connected to the variable vane and transmitting a rotational force to the variable vane.

Other aspects, features and advantages other than those described above will become apparent from the following drawings, claims, and detailed description of the invention.

Advantageous Effects of Disclosure

According to the embodiments of the present disclosure made as described above, the angle of a stator assembly is linked to the change in the angle of a blade body, and when air is discharged through an opening formed on the lower side of a duct, there is an effect of reducing pressure loss due to swirl flow.

In addition, the angle of the stator assembly is changed to be interlocked with the change of the angle of the blade body, and even if the swirl angle is increased, it is possible to minimize a peeling phenomenon, thereby reducing the pressure loss and improving the de-swirl function.

In addition, even if the pitch angle of the blade body is changed, the rotation angle of the variable stator may be changed to correspond to it, and even if the operating conditions of the vertical take-off and landing flight apparatus are changed, excellent performance may be always implemented.

In addition, because the controller controls the driving of the guide vanes, there is an effect that may control maneuvers such as rolling and yawing of the vertical take-off and landing flight apparatus.

BEST MODE

Figure 1:
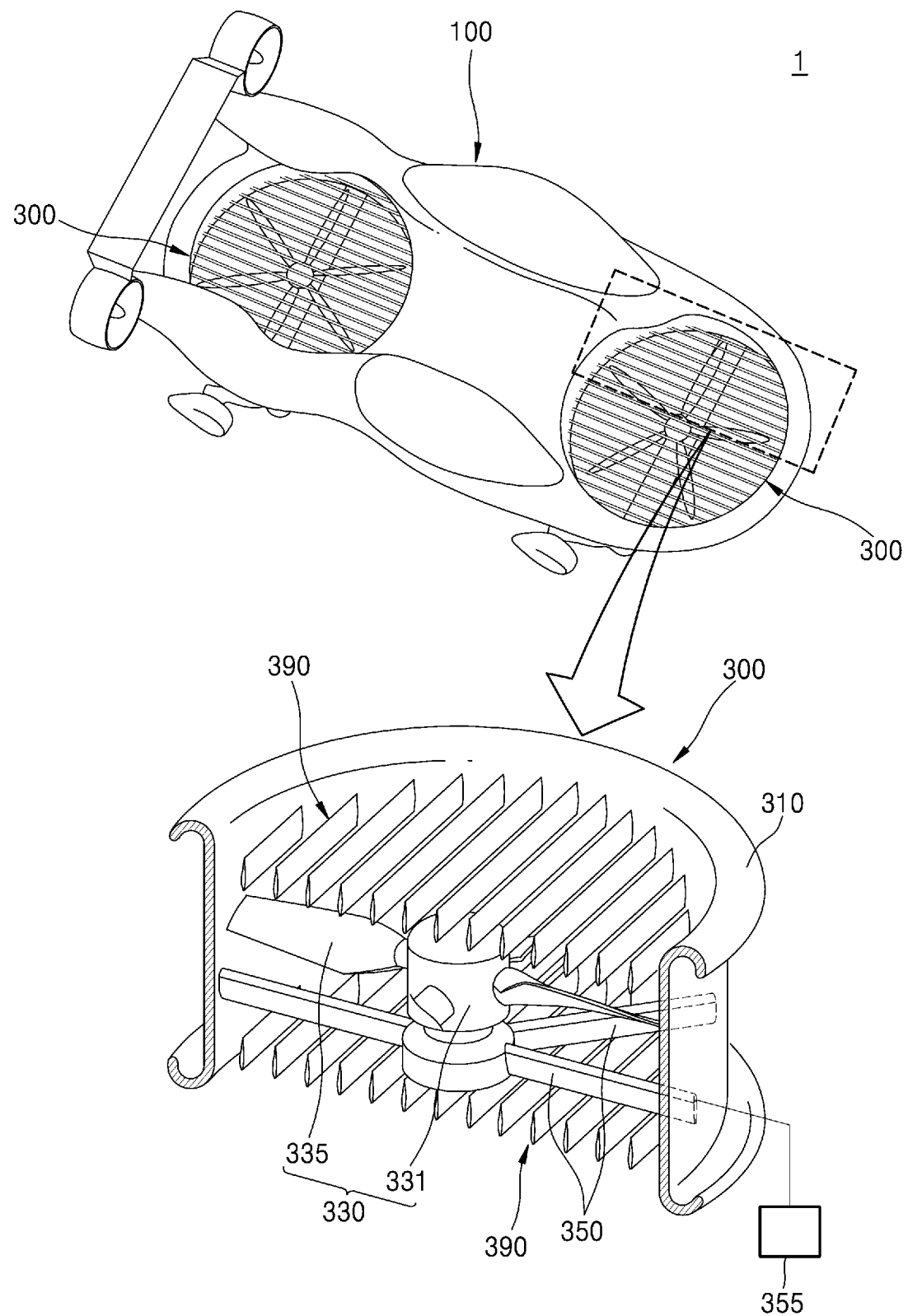
FIG. 1 is a perspective view illustrating a blade-stator system and a vertical take-off and landing flight apparatus including the blade-stator system, according to an embodiment of the present disclosure.

Because the present disclosure may apply various transformations and may have various embodiments, specific embodiments are illustrated in the drawings and described in detail. Effects and features of the present disclosure, and a method of achieving them will become apparent with reference to the embodiments described below in detail in conjunction with the drawings. However, the present disclosure is not limited to the embodiments disclosed below and may be implemented in various forms.

Hereinafter, embodiments of the present disclosure will be described in detail with reference to the accompanying drawings, and when described with reference to the drawings, the same or corresponding components are given the same reference numerals, and the already given description thereof will be omitted.

In the following embodiments, terms such as first, second, etc. are used for the purpose of distinguishing one component from another, not in a limiting sense.

In the following embodiments, the singular expression includes the plural expression unless the context clearly dictates otherwise.

In the following embodiments, terms such as include or have means that the features or components described in the specification are present, and the possibility that one or more other features or components will be added is not excluded in advance.

In the drawings, the size of the components may be exaggerated or reduced for convenience of description. For example, because the size and thickness of each component shown in the drawings are arbitrarily indicated for convenience of description, the present disclosure is not necessarily limited to what is shown.

Hereinafter, a blade-stator system and a vertical take-off and landing flight apparatus including the same according to an embodiment of the present disclosure will be described with reference to the drawings.

Figure 2:
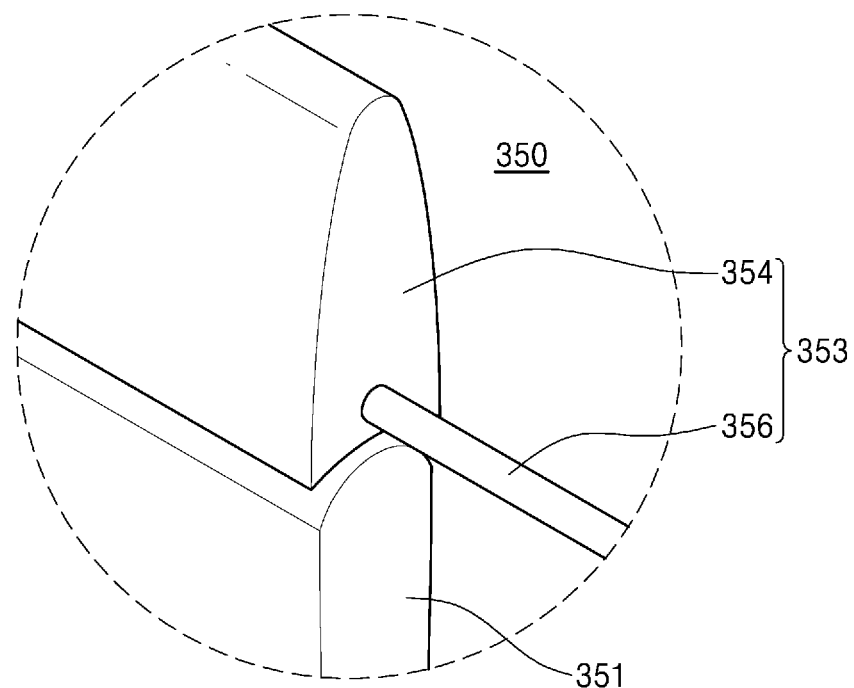
FIG. 2 is a partially enlarged view of a stator assembly according to an embodiment of the present disclosure.
Figure 3:
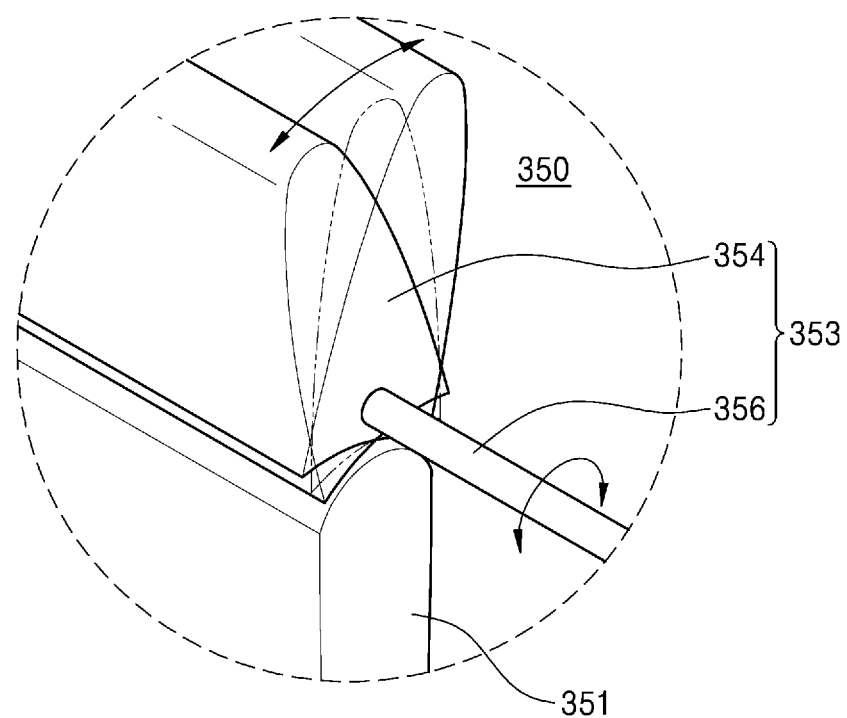
FIG. 3 is a view illustrating a state in which the angle of the stator assembly is changed in FIG. 2.
Figure 4:
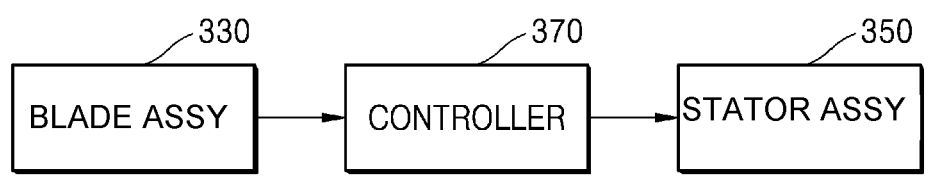
FIG. 4 is a block diagram illustrating a controller according to an embodiment of the present disclosure.
Figure 5A:
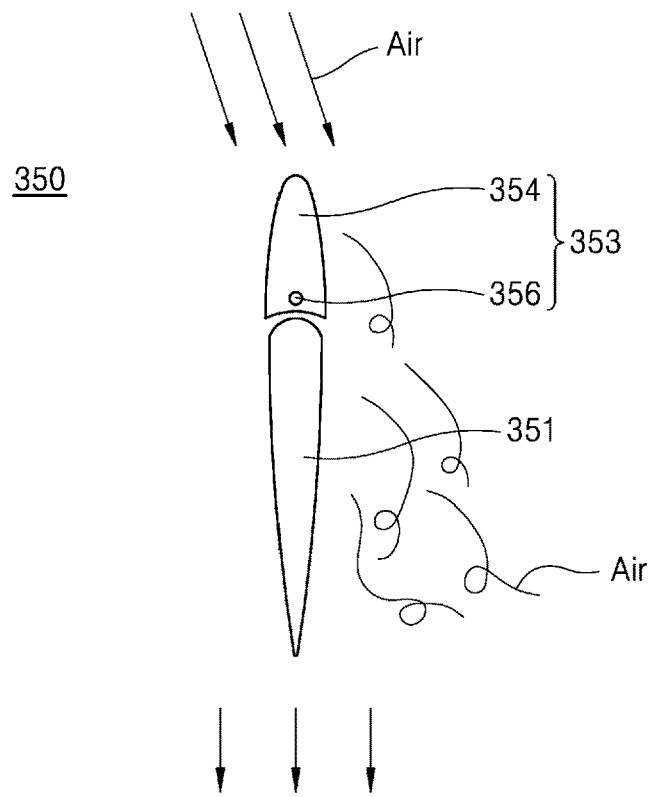
FIG. 5A is a side cross-sectional view illustrating a stator assembly according to an embodiment of the present disclosure.
Figure 5B:
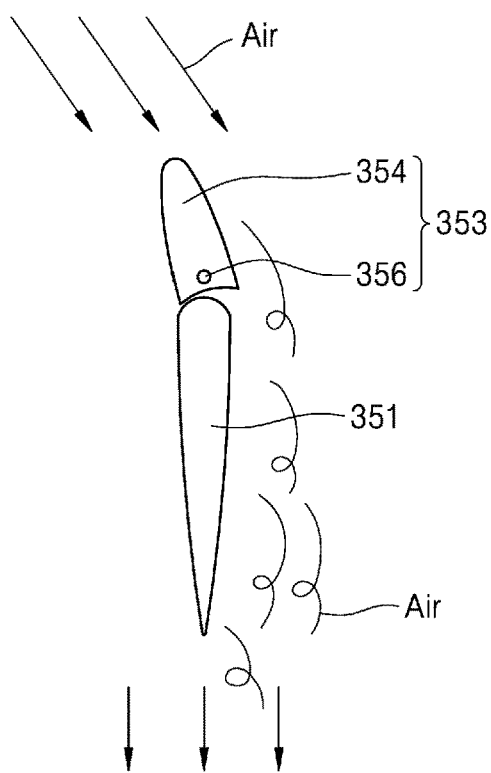
FIG. 5B is a view illustrating a state in which the angle of the stator assembly is changed in FIG. 5A.
Figure 6:
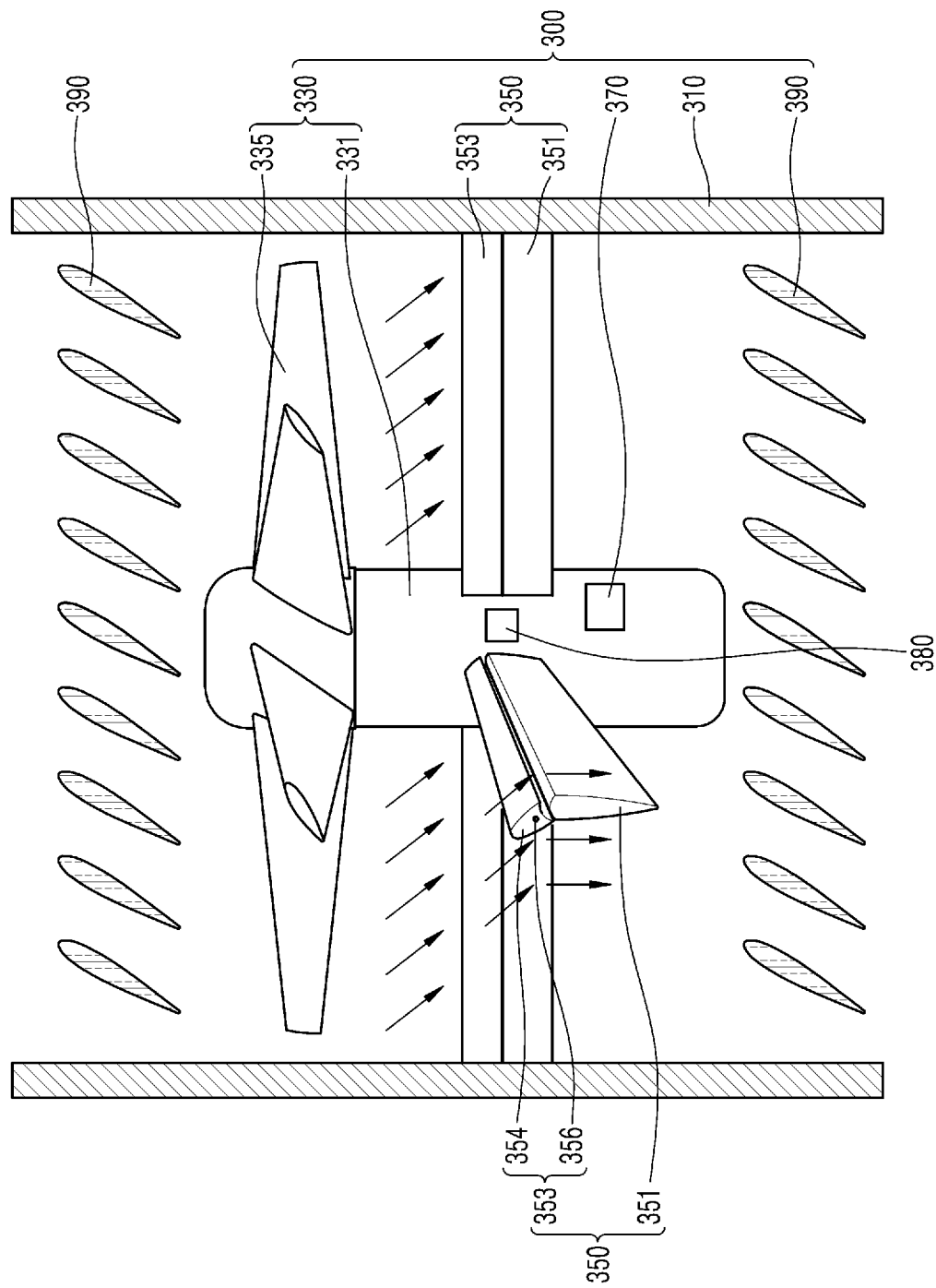
FIG. 6 is a partial front cross-sectional view illustrating a blade-stator system according to an embodiment of the present disclosure.
Figure 8:
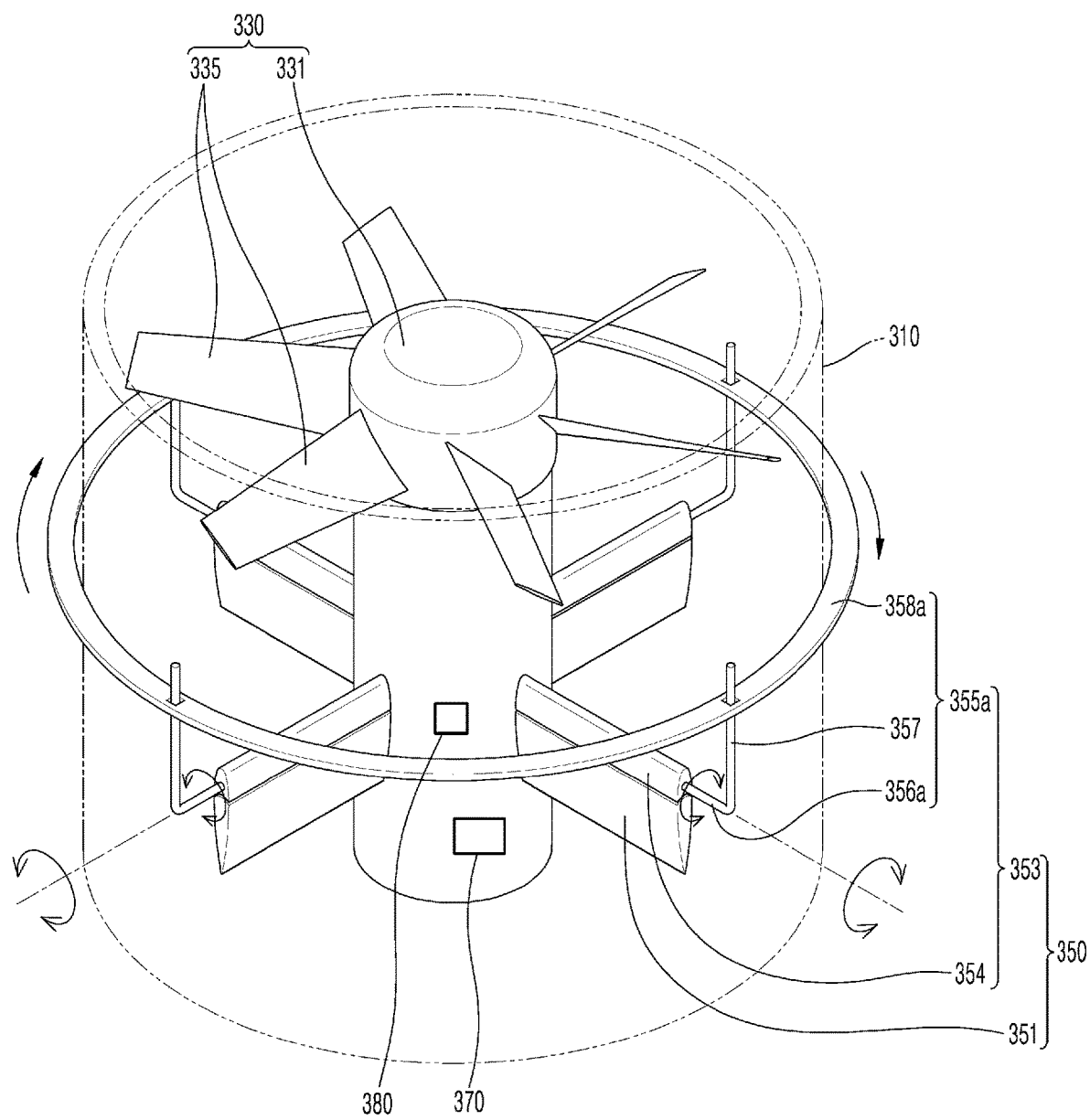
FIG. 8 is a view showing a vane driver according to an embodiment of the present disclosure.

FIG. 1 is a perspective view illustrating a blade-stator system and a vertical take-off and landing flight apparatus including the blade-stator system, according to an embodiment of the present disclosure. FIG. 2 is a partially enlarged view of a stator assembly according to an embodiment of the present disclosure. FIG. 3 is a view illustrating a state in which the angle of the stator assembly is changed in FIG. 2. FIG. 4 is a block diagram illustrating a controller according to an embodiment of the present disclosure. FIG. 5A is a side cross-sectional view illustrating a stator assembly according to an embodiment of the present disclosure. FIG. 5B is a view illustrating a state in which the angle of the stator assembly is changed in FIG. 5A. FIG. 6 is a partial front cross-sectional view illustrating a blade-stator system according to an embodiment of the present disclosure. FIG. 8 is a view showing a vane driver according to an embodiment of the present disclosure.

Referring to FIGS. 1 to 8, a vertical take-off and landing flight apparatus 1 according to an embodiment of the present disclosure may include a flight body 100 and a blade-stator system 300.

Referring to FIG. 1, the flight body 100 according to an embodiment of the present disclosure forms the exterior of the vertical take-off and landing flight apparatus 1, and at least one blade-stator system 300 to be described later may be installed.

Referring to FIG. 1, at least one installation groove (reference numeral not given) may be formed in the flight body 100 to correspond to the number of the blade-stator system 300, in detail, at least one or more ducts 310.

The installation groove according to an embodiment of the present disclosure may be formed in the front or rear with respect to the center of the flight body 100, and may be formed to open in the vertical direction so that air may be introduced or discharged due to the driving of the blade-stator system 300.

Because the blade-stator system 300 is installed in the installation groove formed in the flight body 100, when the blade-stator system 300 is driven, there is an effect that the flight body 100 may take off and land vertically in the vertical direction with respect to the ground.

Although not shown in the drawings, a power supply (not shown) for supplying power to the blade-stator system 300 and a processor (not shown) capable of controlling the driving may be installed inside the flight body 100 according to an embodiment of the present disclosure.

Referring to FIG. 1, the vertical take-off and landing flight apparatus 1 according to an embodiment of the present disclosure may be formed as a manned or unmanned flight apparatus, and because the configuration of the flight apparatus except for the blade-stator system 300 to be described later is a well-known technology, a detailed description related thereto will be omitted.

In order to generate thrust in the flight body 100 according to an embodiment of the present disclosure, various modifications are possible, such as the propeller may be installed so as to be rotatable on the rear side of the flying apparatus 1 (the left side in FIG. 1).

In addition to this, on both sides of the flight body 100, a wing assembly (reference numeral not given) capable of maintaining lift during forward flight after the flight body 100 receives lift force to be spaced apart from the ground and takes off may be installed.

The wing assembly may be coupled to the flight body 100 according to an embodiment of the present disclosure in a fixed position.

However, the present disclosure is not limited thereto, and various modifications are possible, such as the wing assembly being installed so as to be rotatable at a predetermined angle with the longitudinal axis of the flight body 100.

Referring to FIGS. 1 to 8, the blade-stator system 300 according to an embodiment of the present disclosure is to be disposed on the inside of the flight body 100, and specifically may be disposed on the inside of the installation groove formed in the flight body 100.

The blade-stator system 300 according to an embodiment of the present disclosure is provided with at least one, and two are provided in the present disclosure. The blade-stator system 300 may be disposed on the inside of two installation grooves respectively formed on the front and rear sides with respect to the center of the flight body 100.

However, the present disclosure is not limited thereto, and various modifications are possible, such as forming three or more vertical take-off and landing flight apparatuses 1 within the technical idea that may take off and land in the vertical direction while maintaining balance.

Referring to FIGS. 1 to 8, the blade-stator system 300 according to an embodiment of the present disclosure may include a duct 310, a blade assembly 330, a stator assembly 350, a controller 370, a sensor 380, and a guide vane 390.

Referring to FIGS. 1, 6, and 8, the duct 310 according to an embodiment of the present disclosure forms the exterior of the blade-stator system 300 and may be formed in a cylindrical shape.

The duct 310 may have upper and lower sides (refer to FIG. 1) open, and may have a hollow interior. The blade assembly 330, the stator assembly 350, the controller 370, the sensor 380, and the guide vane 390 may be disposed inside the duct 310.

Air is introduced into the opening area formed on the upper side (refer to FIG. 1) of the duct 310 due to the driving of the blade assembly 330, which will be described later, and air may be discharged through an opening area formed on a lower side (refer to FIG. 1) of the duct 310.

As the air flows in and out through the duct 310, lift is generated in the vertical take-off and landing flight apparatus 1, and there is an effect that the vertical take-off and landing flight apparatus 1 may take off in the upward direction.

Due to the duct 310 according to an embodiment of the present disclosure, there is an effect that may provide a path through which air may flow.

The blade assembly 330, the stator assembly 350, the controller 370, the sensor 380, and the guide vane 390 to be described later may be disposed inside the duct 310 according to an embodiment of the present disclosure.

Referring to FIG. 8, the vane drivers 355 and 355*a* according to an embodiment of the present disclosure, specifically, a power transmitter 358*a* are connected to the duct 310, and may be moved by a preset angle on the duct 310 by receiving electrical and mechanical driving force from the outside.

The power transmitter 358*a* may be formed in a ring shape, share a central axis with the duct 310, and may be rotated clockwise or counterclockwise with the central axis of the duct 310 as a central axis of rotation.

The vane drivers 355 and 355*a*, specifically, shaft assemblies 356 and 356*a*, a lever 357, and the power transmitter 358*a* according to an embodiment of the present disclosure will be described in detail later.

Referring to FIGS. 1, 4, 6, and 8, the blade assembly 330 according to an embodiment of the present disclosure is installed inside the duct 310 to be rotatable and may include a blade driver 331 and a blade body 335.

Referring to FIGS. 1, 4, 6, and 8, the blade driver 331 is connected to the stator assembly 350 and may share a central axis with the duct 310. The blade driver 331 may receive power from the outside to generate rotational force.

Referring to FIGS. 1, 6, and 8, at least one blade body 335 may be coupled to the blade driver 331, and at least one or more blade body 335 may be spaced apart from the blade driver 331 as a center.

The blade body 335 according to an embodiment of the present disclosure may be implemented in various modifications, such as may be arranged equiangularly with respect to the blade driver 331 as the center.

The blade body 335 is rotatable by receiving power from the blade driver 331 and using an axis orthogonal to the central axis of the blade driver 331 as the central axis of rotation.

That is, there is an effect of changing the pitch angle of the blade body 335 in contact with the air flowing in from the outside by driving the blade driver 331.

Referring to FIGS. 1, 6, and 8, the stator assembly 350, specifically, a fixed stator 351 may be coupled to the blade driver 331 according to an embodiment of the present disclosure. At least one stator assembly 350 to be described later may be provided.

In detail, referring to FIG. 8, in the present disclosure, four stator assemblies 350 are provided, and the four fixed stators 351 may be spaced apart from each other along the outer circumferential surface of the blade driver 331 with respect to the longitudinal central axis of the blade driver 331.

Referring to FIG. 8, the four fixed stators 351 may be coupled to the blade driver 331 and the inner peripheral surfaces of the duct 310, respectively, and may connect the blade driver 331 to the duct 310.

Due to this, the positions of the blade driver 331 and the fixed stator 351 inside the duct 310 may be fixed.

In addition to this, there is an effect that the blade body 335 which is rotatably coupled to the blade driver 331 and the variable stator 353 disposed on one side (upper side of FIG. 6) of the fixed stator 351 receive the driving force to control the flow path of the air into and out of the blade-stator system 300.

In addition to this, the angle of the stator assembly 350, specifically the variable stator 353, is linked with the change of the pitch angle of the blade body 335, and when the air is discharged through the opening formed on the lower side of the duct 310, there is an effect of reducing the pressure loss due to the swirl flow.

Referring to FIGS. 1 to 6 and 8, the stator assembly 350 according to an embodiment of the present disclosure is connected to the blade assembly 330 and the duct 310 and supports the blade assembly 330 so that the stator assembly 350 may be rotated at a predetermined angle.

Referring to FIGS. 1 to 3 and 8, the stator assembly 350 according to an embodiment of the present disclosure may include a fixed stator 351 and a variable stator 353.

In other words, the stator assembly 350 according to an embodiment of the present disclosure may be composed of a plurality of components that are independently separated from each other, such as the fixed stator 351 and the variable stator 353.

The stator assembly 350 according to an embodiment of the present disclosure may be disposed below the blade assembly 330 (refer to FIG. 1).

Referring to FIGS. 1 to 3, 5A, 5B, 6, and 8, the fixed stator 351 according to an embodiment of the present disclosure connects the duct 310 to the blade assembly 330, and the position may be fixed and the shape may be kept constant.

Referring to FIGS. 2, 3, and 6, the fixed stator 351 is disposed below the variable stator 353 (refer to FIG. 6), and a plurality of fixed stator 351 may be provided.

The plurality of fixed stators 351 may be spaced apart from each other with respect to the blade assembly 330, specifically, the blade driver 331, which shares the vertical central axis with the duct 310.

Referring to FIG. 8, in the present disclosure, four fixed stators 351 are coupled along the outer peripheral surface of the blade driver 331, but the present disclosure is not limited thereto.

In the present disclosure, various modifications are possible within the technical idea that connects the blade driver 331 to the inner peripheral surface of the duct 310.

Because the fixed stator 351 according to an embodiment of the present disclosure is coupled along the outer circumference of the blade driver 331, there is an effect that the blade assembly 330 may be stably supported while maintaining the central axis on the inside of the duct 310.

Referring to FIGS. 1 to 3, 5A, 5B, 6, and 8, the fixed stator 351 according to an embodiment of the present disclosure may be formed in an axial direction (a vertical direction based on FIG. 5A).

Because the shape of the fixed stator 351 according to an embodiment of the present disclosure is formed to be fixed along the axial direction, there is an effect of providing a flow of a predetermined angle to the guide vane 390 to be described later, in detail, the guide vane 390 disposed below the fixed stator 351 (refer to FIG. 1).

In addition to this, due to the fixed stator 351 whose shape is fixed along the axial direction, no stall occurs compared to a flow with a lot of swirl, and there is an effect that may widen the range that may be stably driven.

Referring to FIGS. 1 to 3, 5A, 5B, 6, and 8, the variable stator 353 according to an embodiment of the present disclosure is disposed on one side of the fixed stator 351 and is rotatable at a predetermined angle with respect to the fixed stator 351.

Referring to FIGS. 2 and 3, the variable stator 353 is disposed on the upper side (refer to FIG. 2) of the fixed stator 351, and may include a variable vane 354 and vane drivers 355 and 355a.

Referring to FIGS. 2 and 3, the variable vane 354 according to an embodiment of the present disclosure may be rotated at a predetermined angle in a clockwise or counterclockwise direction with respect to a preset rotational central axis at the upper side of the fixed stator 351.

In other words, the variable vane 354 is capable of relative rotation with respect to the fixed stator 351, specifically, it is possible to rotate 180 degrees.

Because the variable vane 354 is rotatable with respect to the fixed stator 351, there is an effect that may stably meet the flow of air introduced by the rotation of the blade body 335 from the upper side of the stator assembly 350 (based on FIG. 1).

The variable vane 354 according to an embodiment of the present disclosure is capable of relative rotation with respect to the fixed stator 351 by receiving power from the vane drivers 355 and 355a.

Because the stator assembly 350 in which the variable vane 354 is relatively rotatable with respect to the fixed stator 351, is disposed below the blade assembly 330 (refer to FIG. 1), it is possible to reduce swirl.

In addition to this, when the strong swirl flow generated passing through the blade body 335 is introduced into the guide vanes 390 disposed below the blade assembly 330, it is possible to prevent the incident angle from increasing.

In addition to this, by making the variable vane 354 coincide with the swirl angle of the rear of the blade body 335, it is possible to effectively reduce the swirl while reducing the pressure loss of the flow.

In addition to this, the swirl angle reduced due to the stator assembly 350 has an effect of relatively increasing the stall margin of the guide vane 390 disposed on the lower side of the blade assembly 300 by reducing the angle of incidence to the guide vane 390 disposed on the lower side of the blade assembly 330 (refer to FIG. 1), and this may improve the stability of the vertical take-off and landing flight apparatus 1 according to an embodiment of the present disclosure.

Referring to FIGS. 2, 3, 5A, 5B, 6, and 8, the vane drivers 355 and 355a according to an embodiment of the present disclosure are connected to the variable vane 354, and may transmit a rotational force to the variable vane 354.

The vane drivers 355 and 355a may include the shaft assemblies 356 and 356a, the lever 357, and the power transmitter 358a.

The vane drivers 355 and 355a are electrically connected to the controller 370, which will be described later, and may be driven by receiving an electrical signal from the controller 370 to transmit power to the variable vane 354 and may rotate the variable vane 354 clockwise or counterclockwise by a preset angle.

Referring to FIGS. 3, 5B, 6, and 8, the shaft assemblies 356 and 356a according to an embodiment of the present disclosure are coupled to the variable vane 354, and may form a central axis of rotation of the variable vane 354.

The shaft assemblies 356 and 356a may be integrally formed with the variable vane 354, and may be formed independently of each other so that the variable vane 354 may be rotated in association with the rotation of the shaft assemblies 356 and 356a.

The shaft assemblies 356 and 356a are disposed parallel to the central axis in the longitudinal direction of the variable vane 354 and may be inserted through the variable vane 354.

Referring to FIG. 8, the lever 357 according to an embodiment of the present disclosure is coupled to the shaft assemblies 356 and 356a, and the lever 357 receives power from the power transmitter 358a to rotate the shaft assemblies 356 and 356a. In the present disclosure, the lever 357 and the shaft assemblies 356 and 356a are formed and coupled independently of each other, but the present disclosure is not limited thereto, and various modifications such as integrally formed are possible.

Referring to FIG. 8, the power transmitter 358a according to an embodiment of the present disclosure is connected to the lever 357, and may transmit power to the lever 357.

The power transmitter 358a may rotate with the center of the duct 310 as a central axis of rotation, and when the power transmitter 358a rotates on the duct 310, the lever 357 may be rotated.

The power transmitter 358a according to an embodiment of the present disclosure may be formed in a ring shape, and may be movably connected on the duct 310. As the ring-shaped power transmitter 358a rotates, the lever 357 connected to the power transmitter 358a may be rotated.

The power transmitter 358a may be driven by receiving power from the outside, and may be electrically connected to the controller 370 to receive an electrical signal from the controller 370 and rotate clockwise or counterclockwise on the duct 310.

One end of the lever 357 is coupled to the shaft assemblies 356 and 356a, and the other end opposite to the one end of the lever 357 may pass through a hole (reference numeral not given) formed in the power transmitter 358a and span the power transmitter 358a.

Referring to FIG. 8, shaft assemblies 356 and 356a coupled to the variable vane 354 according to an embodiment of the present disclosure may pass through the duct 310 and be coupled to the lever 357 disposed outside the duct 310.

Due to this, the rotation of the power transmitter 358a drives the lever 357, and when the lever 357 is rotated clockwise or counterclockwise, there is an effect of rotating the shaft assemblies 356 and 356a and the variable vane 354 coupled to the shaft assemblies 356 and 356a.

Referring to FIG. 8, at least one stator assembly 350 may be provided, and at least one hole may be formed in the power transmitter 358a to correspond to the at least one or more stator assemblies 350.

Due to this, at least one lever 357 is rotated by the rotational operation of the single power transmitter 358a, and the shaft assemblies 356 and 356a connected to the lever 357 are rotated in a clockwise or counterclockwise direction. Due to the rotation of the shaft assemblies 356 and 356a, there is an effect that the variable vane 354 may be rotated from the upper side (refer to FIG. 8) of the fixed stator 351.

Referring to FIGS. 4, 6, and 8, the controller 370 according to an embodiment of the present disclosure is electrically connected to the blade assembly 330 and the stator assembly 350, and may control the driving of the blade body 335 and the stator assembly 350.

The controller 370 according to an embodiment of the present disclosure may be electrically connected to the sensor 380. The sensor 380 may sense the pitch angle of the blade assembly 330, specifically, the blade body 335, and may transmit information related thereto to the controller 370.

The controller 370 may sense the pitch angle of the blade body 335 from the sensor 380, and may transmit an electrical signal to the stator assembly 350, specifically, the variable stator 353 to correspond to the pitch angle of the blade body 335.

Due to this, the vane drivers 355 and 355a are driven, there is an effect that by receiving power from the vane drivers 355 and 355a, the variable vane 354 may rotate in a predetermined angle range in a clockwise or counterclockwise direction on the stator assembly 350.

In other words, the controller 370 may control the driving of the blade assembly 330 and the stator assembly 350, and as the angle of the variable stator 353 located on the upper side of the stator assembly 350 is changed in association with the change of the pitch angle, which is the angle of the blade body 335, the pressure loss at the outlet side of the air flowing into the duct 310 may be reduced, and there is an effect that may improve the performance of the system.

In the present disclosure, the controller 370 is electrically connected to each of the blade assembly 330 and the stator assembly 350 to control each drive, but a single power transmission mechanism (not shown) connecting the blade assembly 330 to the stator assembly 350 may be provided, and various modifications, such as the controller 370 being able to control the driving of the power transmission mechanism are possible.

Due to this, when the pitch angle of the blade body 335 is changed, there is an effect that the variable stator 353 may be rotated clockwise or counterclockwise from the upper side (refer to FIG. 8) of the fixed stator 351 to correspond to this.

The controller 370 according to an embodiment of the present disclosure may be electrically connected to the guide vane 390 to be described later, and for this reason, the controller 370 may control the driving of the guide vanes 390 respectively disposed on the upper side of the blade assembly 330 (refer to FIG. 8) and the lower side of the stator assembly 350 (refer to FIG. 8).

The guide vane 390 according to an embodiment of the present disclosure may be rotated inside the duct 310 by receiving an electrical signal from the controller 370.

By controlling the driving of the guide vanes 390 by the controller 370, there is an effect of controlling maneuvers such as rolling and yawing of the vertical take-off and landing flight apparatus 1.

The controller 370 according to an embodiment of the present disclosure may simultaneously control the blade body 335 and the variable stator 353 disposed inside the duct 310.

Due to this, even if the pitch angle of the blade body 335 is changed, the rotation angle of the variable stator 353 may be changed to correspond thereto, and even if the operating conditions of the vertical take-off and landing flight apparatus 1 are changed, there is an effect that may always realize excellent performance.

Referring to FIGS. 4, 6, and 8, the controller 370 according to an embodiment of the present disclosure may be installed in the blade driver 331.

However, the controller 370 is not limited thereto, and various modifications are possible, such as the controller 370 being electrically connected to the blade-stator system 300 and installed in the flight body 100 within the technical idea of controlling the driving.

Referring to FIGS. 6 and 8, the sensor 380 according to an embodiment of the present disclosure measures the pitch angle of the blade body 335 and the rotation angle of the variable stator 353, and may be electrically connected to the controller 370.

In the present disclosure, the sensor 380 is installed in the blade driver 331, but is not limited thereto, and various modifications are possible within the technical idea that may measure the pitch angle of the blade body 335 and the rotation angle of the variable stator 353.

In the present disclosure, the sensor 380 may be configured independently of the controller 370, may be electrically connected to the controller 370, and may transmit/receive information on the pitch angle of the blade body 335 and the rotation angle of the variable stator 353.

However, the sensor 380 is not limited thereto and may be formed integrally with the controller 370, and various modifications are possible, such as the controller 370 electrically connected to the blade body 335 and the variable stator 353 sensing the pitch angle of the blade body 335 and the rotation angle of the variable stator 353 and controlling the driving.

Referring to FIGS. 1 and 6, the guide vane 390 according to an embodiment of the present disclosure is disposed outside the blade assembly 330 and the stator assembly 350, and may be installed inside the duct 310.

A plurality of guide vanes 390 according to an embodiment of the present disclosure are provided, and the plurality of guide vanes 390 may have longitudinal axes parallel to each other.

The plurality of guide vanes 390 are connected to the duct 310 to be disposed inside the duct 310, and may be coupled to the inner circumferential surface of the duct 310 to be rotatable.

The guide vane 390 is electrically connected to the controller 370 and may be rotated clockwise or counterclockwise with the longitudinal axis as the central axis of rotation by a motor or the like by receiving an electrical signal from the controller 370.

The guide vane 390 according to an embodiment of the present disclosure may guide a flow path of air introduced into or discharged from the duct 310.

The guide vane 390 according to an embodiment of the present disclosure is disposed above and below the blade assembly 330 and the stator assembly 350 and may be installed in the duct 310.

Referring to FIG. 6, the guide vane 390 disposed on the lower side of the stator assembly 350 (refer to FIG. 6) is driven by receiving an electrical signal from the controller 370 and is rotatable inside the duct 310.

Due to this, there is an effect of controlling maneuvers such as rolling and yawing of the vertical take-off and landing flight apparatus 1.

Figure 7:
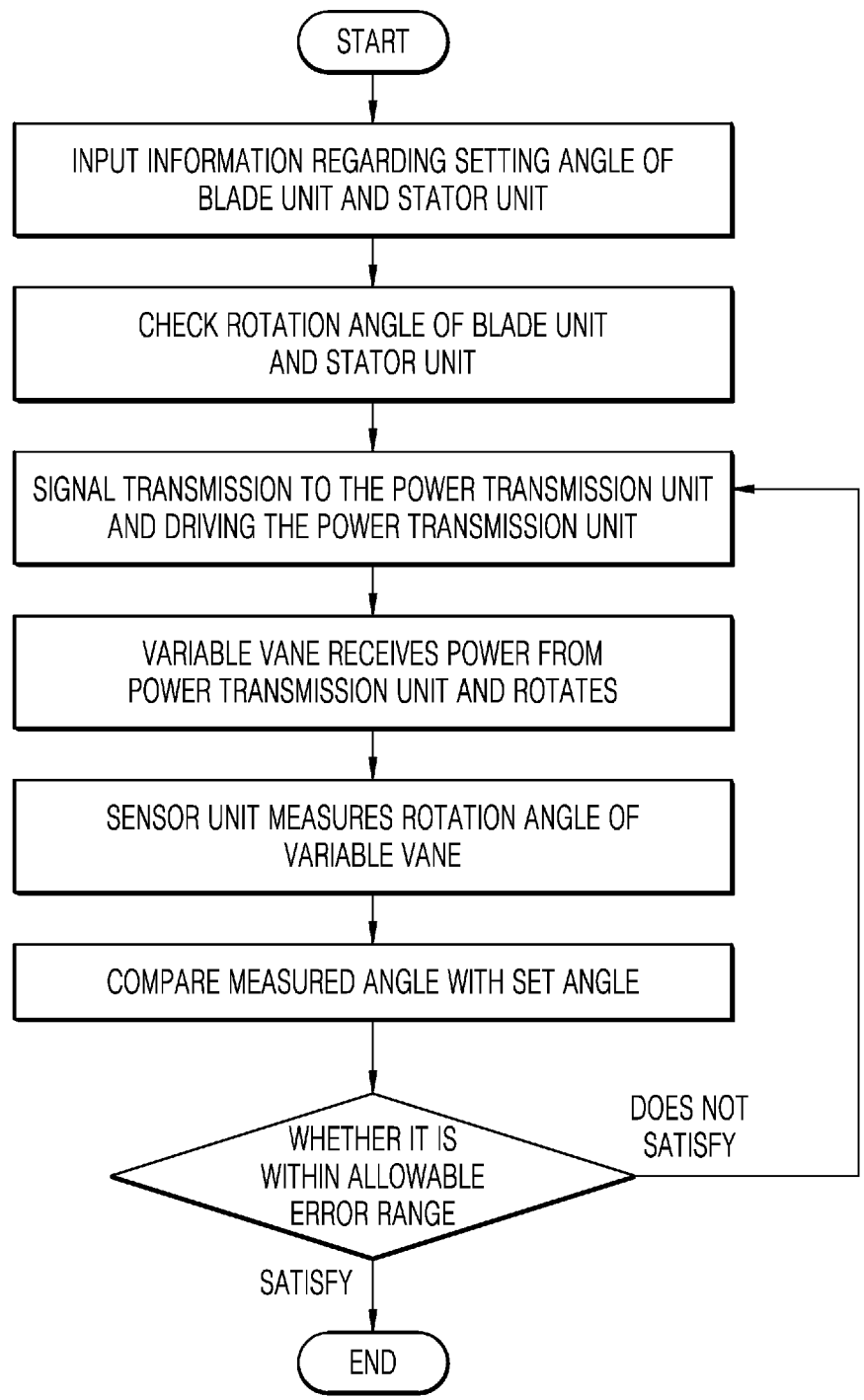
FIG. 7 is a flowchart illustrating a method of driving a blade-stator system according to an embodiment of the present disclosure.

The above-described blade-stator system 300 will be described with respect to the operating principle and effect of the vertical take-off and landing flight apparatus 1. FIG. 7 is a flowchart illustrating a method of driving a blade-stator system 300 according to an embodiment of the present disclosure.

Referring to FIGS. 1 to 8, the vertical take-off and landing flight apparatus 1 according to an embodiment of the present disclosure may include a flight body 100 and a blade-stator system 300.

The blade-stator system 300 according to an embodiment of the present disclosure is disposed on the inside of the flight body 100, and may include a duct 310, a blade assembly 330, a stator assembly 350, and a controller 370, a sensor 380, and a guide vane 390.

The controller 370 according to an embodiment of the present disclosure may be electrically connected to the blade assembly 330, the stator assembly 350, the sensor 380, and the guide vane 390. The controller 370 may control driving by transmitting electrical signals to the blade assembly 330, the stator assembly 350, and the guide vane 390.

Referring to FIG. 7, information regarding the setting angle of the blade assembly 330 and the stator assembly 350 may be input to the controller 370.

In detail, information regarding the setting angle of the blade assembly 330 and the stator assembly 350 for maneuver of the vertical take-off and landing flight apparatus 1 may be input.

Referring to FIG. 1, the blade assembly 330 may include the blade driver 331 and the blade body 335.

The blade body 335 according to an embodiment of the present disclosure is rotatable on the blade driver 331 by receiving power from the blade driver 331, and may change the pitch angle by receiving an electrical signal from the controller.

Referring to FIGS. 2, 3, 5A, and 5B, the stator assembly 350 according to an embodiment of the present disclosure may include a fixed stator 351 and a variable stator 353.

Referring to FIGS. 1, 6, and 8, the fixed stator 351 may be coupled with a fixed position between the blade assembly 330, specifically, the blade driver 331 and the duct 310.

Because the fixed stator 351 is fixed in position between the blade driver 331 and the inner circumferential surface of the duct 310, there is an effect that may stably support the blade assembly 330.

Referring to FIGS. 2, 3, and 5, the variable stator 353 according to an embodiment of the present disclosure is rotatable at a predetermined angle at the upper side of the fixed stator 351 (based on FIG. 2), and may include the variable vane 354 and vane drivers 355 and 355a.

Referring to FIG. 7, the controller 370 according to an embodiment of the present disclosure may receive information on the pitch angle of the blade body 335 and the rotation angle of the variable stator 353 from the blade assembly 330 and the stator assembly 350.

The controller 370 may directly receive information regarding the pitch angle and rotation angle from the blade assembly 330 and the stator assembly 350, and various modifications are possible, such as the controller 370 receiving information regarding the pitch angle and rotation angle from the sensor 380.

Referring to FIGS. 4 and 7, the controller 370 according to an embodiment of the present disclosure may transmit an electrical signal to the variable stator 353 by calculating a rotation angle of the stator assembly 350, specifically the variable stator 353, corresponding to the pitch angle of the blade assembly 330, specifically the blade body 335.

Referring to FIG. 8, the vane drivers 355 and 355a according to an embodiment of the present disclosure may include shaft assemblies 356 and 356a, a lever 357, and a power transmitter 358a.

The controller 370 may transmit an electrical signal to the power transmitter 358a, and the power transmitter 358a may be driven by receiving an electrical signal from the controller 370. The power transmitter 358a according to an embodiment of the present disclosure is formed in a ring shape, and may be rotated clockwise or counterclockwise at the outside of the duct 310.

As the power transmitter 358a rotates, the lever 357 connected to the power transmitter 358a is rotated, and the shaft assemblies 356 and 356a coupled to the lever 357 may also be rotated.

The shaft assemblies 356 and 356a are coupled to the variable vane 354, and by forming the rotational central axis of the variable vane 354, the variable vane 354 may be rotated by a predetermined angle in a clockwise or counterclockwise direction at the upper side of the fixed stator 351 (refer to FIG. 3).

Referring to FIGS. 5A and 5B, due to the rotation of the blade assembly 330, specifically the blade body 335, air is introduced toward the stator assembly 350 from the upper side (refer to FIG. 5A), and the flow of air may be inclinedly introduced by the pitch angle of the blade body 335.

Referring to FIG. 5A, when the variable stator 353, specifically the variable vane 354, disposed on the lower side of the blade body 335 is uniformly formed in the vertical direction regardless of the pitch angle of the blade body 335, as the swirl angle increases, the peeling phenomenon increases and there is a problem in that the de-swirl function is deteriorated.

However, as shown in FIG. 5B, because the variable vane 354 disposed on the lower side of the blade body 335 is rotated by a predetermined angle in the counterclockwise direction (based on FIG. 5B) to correspond to the pitch angle of the blade body 335 with the shaft assemblies 356 and 356a as the central axis of rotation, even if the swirl angle is increased, there is an effect of minimizing the peeling phenomenon and improving the de-swirl function.

In addition to this, there is an effect that may improve the performance of the vertical take-off and landing flight apparatus 1 by reducing the pressure loss in the lower side of the duct 310, the exit area.

Referring to FIG. 7, the sensor 380 according to an embodiment of the present disclosure may measure the rotation angle of the variable stator 353, specifically, the variable vane 354, and transmit the measured angle to the controller 370 as an electrical signal.

However, the present disclosure is not limited thereto, and various modifications such as being able to directly receive information about the rotation angle from the stator assembly 350, specifically the variable stator 353, are possible.

Referring to FIG. 7, the controller 370 may compare the measured angle with respect to the rotation angle received from the sensor 380 or the stator assembly 350 with a set angle.

The controller 370 compares the measured angle with the set angle to check whether it is within the allowable error range, and when it does not satisfy the error range, the electric signal is transmitted to the power transmitter 358a again to adjust the rotation angle of the variable vane 354.

By repeating this process, there is an effect that may implement the optimal rotation angle of the variable stator 353 to correspond to the pitch angle of the blade body 335, specifically the variable vane 354.

In addition to this, the controller 370 controls the driving of the blade assembly 330 and the stator assembly 350 so that the rotation angle of the variable vane 354 is linked to the change in the pitch angle of the blade body 335, thereby reducing the pressure loss at the outlet side of the duct 310. Thus, there is an effect of improving the performance of the blade-stator system 300.

Hereinafter, the configuration, operation principle and effect of a vertical take-off and landing flight apparatus including a blade-stator system according to another embodiment of the present disclosure will be described.

Figure 9:
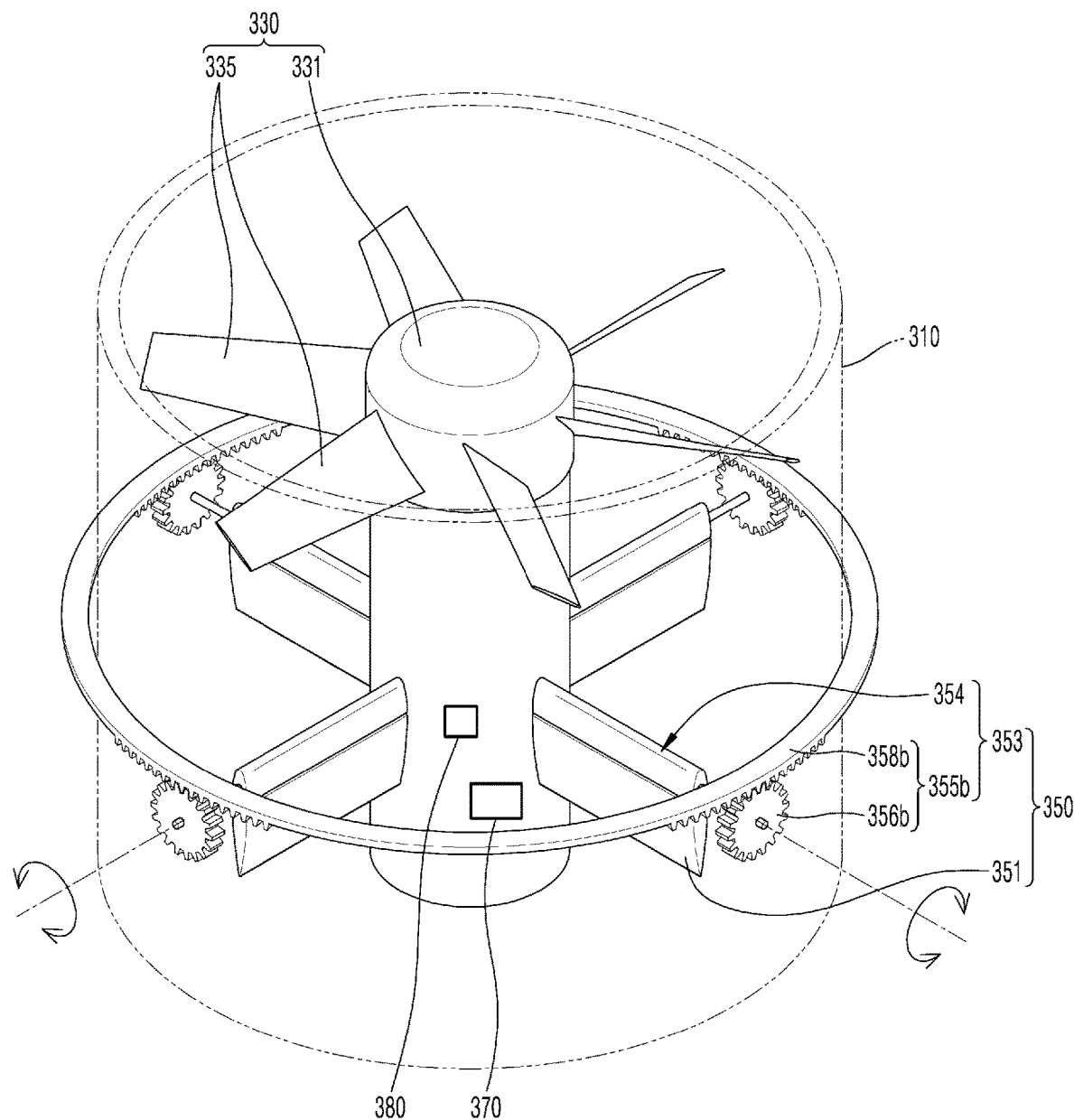
FIG. 9 is a view showing a vane driver according to another embodiment of the present disclosure.

Referring to FIG. 9, the vertical take-off and landing flight apparatus 1 according to another embodiment of the present disclosure may include a flight body 100 and a blade-stator system 300.

The blade-stator system 300 according to another embodiment of the present disclosure may include a duct 310, a blade assembly 330, a stator assembly 350, a controller 370, a sensor 380, and a guide vane 390.

Referring to FIG. 9, the stator assembly 350 according to another embodiment of the present disclosure may include a fixed stator 351 and a variable stator 353, and the variable stator 353 may include a variable vane 354 and a vane driver 355b.

Referring to FIG. 9, the vane driver 355b according to another embodiment of the present disclosure may include a shaft assembly 356b and a power transmitter 358b.

The power transmitter 358b according to another embodiment of the present disclosure is connected to the shaft assembly 356b, and may transmit power to the shaft assembly 356b. The power transmitter 358b is formed in a ring shape and is rotatable in a clockwise or counterclockwise direction by receiving power from the outside.

The power transmitter 358b is disposed in contact with the shaft assembly 356b to engage the shaft assembly 356b, and gear teeth may be formed on one surface (the lower surface of FIG. 9) of the power transmitter 358b facing the shaft assembly 356b.

The gear teeth may be formed in a preset section on the lower surface of the power transmitter 358b.

The gear teeth may be formed to face the power transmitter 358b and to engage the gear teeth along an outer circumferential surface of an end of the contactable shaft assembly 356b.

Due to this, when the power transmitter 358b receives power and rotates along the circumference of the outer peripheral surface of the duct 310, while connected to the shaft assembly 356b in a gear manner, there is an effect of transmitting a rotational force to the shaft assembly 356b.

As the shaft assembly 356b rotates about the central axis in the longitudinal direction as the central axis of rotation, the variable vane 354 coupled to the shaft assembly 356b is rotated clockwise or counterclockwise, and there is an effect that the rotation angle of the variable vane 354 may correspond to the pitch angle of the blade body 335.

In addition to this, as the controller 370 controls the driving of the blade assembly 330 and the stator assembly 350 so that the rotation angle of the variable vane 354 is linked to the change in the pitch angle of the blade body 335, the pressure loss at the outlet side of the duct 310 is reduced, thereby improving the performance of the blade-stator system 300.

In the vertical take-off and landing flight apparatus 1 according to another embodiment of the present disclosure, the vane driver 355b for transmitting power to the variable vane 354 in the blade-stator system 300 includes the shaft assembly 356b and the power transmitter 358b, and except that the rotation angle of the variable vane 354 may be changed as the shaft assembly 356b and the power transmitter 358b are engaged and rotated in a gear manner, the configuration, operation principle, and effect of the flight body 100, the duct 310, the blade assembly 330, the fixed stator 351, the variable vane 354, the controller 370, the sensor 380, and the guide vane 390 are the same as those of the vertical take-off and landing flight apparatus according to the embodiment of the present disclosure described above. Accordingly, the already given description will be omitted.

As described above, the present disclosure has been described with reference to one embodiment shown in the drawings, but this is only an example, and it will be understood by those skilled in the art that various modifications and variations of embodiments are possible therefrom. Accordingly, the true technical protection scope of the present disclosure should be determined by the technical idea of the appended claims.

INDUSTRIAL APPLICABILITY

According to the present disclosure, a blade-stator system is provided. In addition, embodiments of the present disclosure may be applied to a vertical take-off and landing flight apparatus and the like to which industrially used blade-stator system is applied.

The invention claimed is:

1. A blade-stator system comprising:
a duct disposed inside a flight body, wherein upper and lower sides of the duct are open, and an inside of the duct is hollow;
a blade assembly installed rotatably inside the duct and including a blade body of which an angle is changeable;
a stator assembly connected to the blade assembly and the duct, supporting the blade assembly; and
a controller electrically connected to the blade assembly and the stator assembly and configured to control driving of the blade body and the stator assembly,
wherein the stator assembly comprises:
a fixed stator connecting the duct to the blade assembly and of which a position is fixed; and
a variable vane rotating with respect to the fixed stator; and
a vane driver connected to the variable vane and transmitting a rotational force to the variable vane,
wherein the variable vane is disposed between the blade assembly and the fixed stator so that air is configured to flow from the blade assembly toward the variable vane and then to the fixed stator, and
wherein the controller adjusts the rotation angle of the variable vane to correspond to a change of a pitch angle of the blade body.

2. The blade-stator system of claim 1,
wherein the blade assembly comprises:
a blade driver connected to the stator assembly and sharing a central axis with the duct; and
at least one blade body rotatably coupled to the blade driver.

3. The blade-stator system of claim 2, wherein the at least one blade body is spaced apart each other with respect to a center of the blade driver.

4. The blade-stator system of claim 1, further comprising:
a guide vane disposed outside the blade assembly and the stator assembly, installed inside the duct, and guiding a flow path of air introduced into or discharged from the duct.

5. The blade-stator system of claim 4, wherein the guide vane is electrically connected to the controller and is rotatable inside the duct.

6. The blade-stator system of claim 4, wherein the guide vanes are disposed above and below the blade assembly and the stator assembly and are installed in the duct.

7. The blade-stator system of claim 1,
wherein the stator assembly is provided in plurality, is spaced apart each other with respect to a center of the blade assembly, and is connected to the duct.

8. A vertical take-off and landing flight apparatus comprising:
a flight body; and
a blade-stator system,
wherein the blade-stator system comprises: a duct disposed inside the flight body, upper and lower sides of the duct being open, and an inside of the duct being hollow; a blade assembly installed rotatably inside the duct and including a blade body of which an angle is changeable; a stator assembly connected to the blade assembly and the duct, supporting the blade assembly; a controller electrically connected to the blade assembly and the stator assembly and configured to control driving of the blade body and the stator assembly,
wherein the stator assembly comprises:
a fixed stator connecting the duct to the blade assembly and of which a position is fixed; and
a variable vane rotating with respect to the fixed stator; and
a vane driver connected to the variable vane and transmitting a rotational force to the variable vane,
wherein the variable vane is disposed between the blade assembly and the fixed stator so that air is configured to flow from the blade assembly toward the variable vane and then to the fixed stator, and
wherein the controller adjusts a rotation angle of the variable vane to correspond to a change of a pitch angle of the blade body.

9. A blade-stator system comprising:
a duct disposed inside a flight body, wherein upper and lower sides of the duct are open, and an inside of the duct is hollow;
a blade assembly installed rotatably inside the duct and including a blade body of which an angle is changeable;
a stator assembly connected to the blade assembly and the duct, supporting the blade assembly, and rotatable by a predetermined angle; and
a controller electrically connected to the blade assembly and the stator assembly and configured to control driving of the blade body and the stator assembly,
wherein, an angle of the stator assembly is predetermined based on the angle of the blade body, and
wherein, in response to an electrical signal from the controller, the angle of the stator assembly is changed as to be interlocked with a change of the angle of the blade body.

10. The blade-stator system of claim 9, further comprising:
a guide vane disposed downstream of the stator assembly and inside the duct, the guide vane configured to guide a flow path discharged from the duct based on an angle of the guide vane,
wherein the controller is electrically connected to the guide vane and configured to control the angle of the guide vane.

* * * * *